United States Patent [19]

Bertelson

[11] 3,802,271
[45] Apr. 9, 1974

[54] METHOD OF ACOUSTICALLY ANALYZING PARTICLES IN A FLUID

[76] Inventor: Peter C. Bertelson, 30325 Ponds View Dr., Franklin, Mich. 48025

[22] Filed: May 4, 1971

[21] Appl. No.: 140,099

[52] U.S. Cl. .................. 73/432 PS, 73/28, 73/61 R
[51] Int. Cl. .......................................... G01n 29/02
[58] Field of Search ............... 73/23, 24, 28, 30, 53, 73/61, 61 A, 69, 432 PS; 340/237 S; 324/71 PC

[56] References Cited
FOREIGN PATENTS OR APPLICATIONS

| | | | |
|---|---|---|---|
| 1,197,130 | 11/1959 | France | 73/61 |
| 180,844 | 5/1966 | U.S.S.R. | 73/61 |
| 180,845 | 5/1966 | U.S.S.R. | 73/61 |
| 205,356 | 1/1968 | U.S.S.R. | 73/432 PS |
| 1,010,297 | 6/1957 | Germany | 73/53 |

Primary Examiner—Charles A. Ruehl
Attorney, Agent, or Firm—Hugh L. Fisher

[57] ABSTRACT

A method for acoustically analyzing particles in a fluid whereby plural frequency sound waves are generated by a sound sending transducer over a certain frequency range and then transferred through the fluid with the particles to be analyzed and also through the fluid without the particles to a sound receiving transducer. The phase relationship of the two sound waves at each frequency is compared to establish the maximum phase shifts from which the fractional weight of the particles, their size, and the number of particles per unit of volume can be determined. When there are several sizes of particles, the maximum phase shifts for different sizes are integrated to obtain a total particle fractional weight. Also, a non-sinusoidal wave form can be used, such as a square wave, to provide the required frequency range.

15 Claims, 6 Drawing Figures

INVENTOR.
Peter C. Bertelson 3,802,271

METHOD OF ACOUSTICALLY ANALYZING PARTICLES IN A FLUID

This invention relates to a method of acoustically analyzing the particles in a fluid.

It is often necessary to analyze the particle content of a fluid either in a gaseous or liquid form; e.g., to insure that excessively dusty air does not become a health hazard; that industrial smokestack emissions do not exceed statutory limits or that a combustion process is operating efficiently. At present the particle analysis is time consuming, involves complex and costly equipment and is still restricted in accuracy.

With the foregoing in mind, a new and different method is comtemplated for analyzing the particles in a fluid whereby acoustical energy over a predetermined frequency range is transferred through a fluid with the particles to be analyzed and also through the fluid without the particles to determine as the frequency range is scanned the maximum phase shift therebetween and from which, data concerning the particles is obtained.

Also contemplated is such a method whereby plural frequency sound waves are transferred through a fluid both with and without the particles to determine the maximum phase shift between the sound waves transferred through the fluid with the particles and the sound waves transferred through a fluid without the particles and then determining from the maximum phase shift the particle data.

Further contemplated is a unique method for acoustically analyzing the particles present in the fluid whereby sound waves over a certain frequency range with a predetermined minimum and maximum limits are transferred through a fluid both with and without the particles and then the phase variations at each frequency between the sound waves transferred through the fluid with the particles and the sound waves transferred through the fluid without the particles are compared to determine the maximum phase variation for each particle size after which each maximum phase variation is integrated to obtain a total particle weight fraction.

Still another objective is to provide a new method of acoustically analyzing the particles in a fluid utilizing acoustic energy of the many frequencies present in a non-sinusoidal wave form which is transferred through a fluid both with and without the particles from a source to a remotely positioned sound receiving transducer where the sound pressures resulting from the acoustical energy transferred through the fluid with the particles and through the fluid without the particles are compared so as to obtain data relative to the particles.

Further objectives include the provision of a method for acoustical analysis of particles in a fluid with simple, inexpensive detector apparatus that can be portable or permanently located.

The foregoing and other objects and advantages of the invention will become apparent from the following description and the accompanying drawings in which.

By the invention and as will become apparent, it is possible to measure the weight, size, and number of the solid or liquid particles present in the gas or liquid medium. This is accomplished by applying acoustical energy to the fluid with the particles and also to the same or different fluid without the particles. The sound waves transferred through the fluid with the particles and the fluid without the particles are of the same frequency and each travels a fixed distance to a point where they are sensed or detected. It is known that the frequency of the two sound waves will not change but the sound wave proceeding through the fluid with the particles will have its phase delayed as compared to the phase of the sound wave proceeding through the fluid without the particles. This phase difference then can be utilized to obtain the desired particle data and more particularly the fractional weight of all the particles. The fractional weight $f$ which is equal to the mass of particles per unit mass of suspending fluid is a criterion often used to determine whether industrial emissions exceed a legal limit, such as 0.004. This value can be contrasted with the maximum fractional weight of 0.2 since it is known that air will not support more than 20 percent of its own weight.

To derive the particle data Newton's well known Second Law of Motion; namely, force equals the product of the mass and the acceleration, is used to develop one-dimensional equations of motion for the particle and for the fluid.

For the particles by Stokes' Law the $$\text{force} = 6\pi a \mu (U - V); \tag{1}$$

$$\text{acceleration} = \delta V/\delta t; \text{ and} \tag{2}$$

$$\text{mass} = (4/3)\pi a^3 \rho_s \tag{3}$$

where $a$ is the radius of the particle, $P_s$ is the particle mass density, $\mu$ is the fluid viscosity, $U$ is the fluid velocity and $V$ is the particle velocity. Thus, we have the equation $$(4/3)\pi a^3 \rho_s (\delta V/\delta t) = 6\pi a \mu(U-V), \text{ or} \tag{4}$$

$$\delta V/\delta t = (U-V)/\tau, \text{ where } \tau \tag{5}$$

is equivalent to $2a^2 \rho_s/9\mu$

This equiation (5) illustrates the parameters which are important in evaluating particle motion. These parameters as can be observed, are the mass density $\rho_s$ of the particle, the fluid viscosity $\mu$ and the particle size $a$ and, of course, are non-variable.

Figure 6:
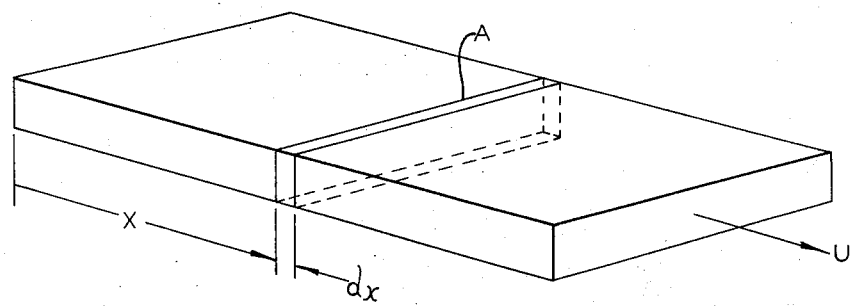
FIG. 6 shows a portion of a duct used in a mathematical analysis.

There is a similar equation for the fluid. With reference to FIG. 6, it will be assumed that there is a uniform tube or duct area (A) and a volume element ($d$ vol = $A$ $dx$) with the porosity ($p$) approaching 100 percent (on a volume basis), and a uniform particulate volume fraction ($1-p$) for uniform spherical particles of a radius $a$. Therefore, the mass of the particles = $(1-p) \rho_s (A\,dx)$  (6)

the mass of the fluid = $p\, \rho_f (A\,dx)$  (7)

where $\rho_f$ is the mass density of the fluid;
and the mass of a particle = $(4/3) \rho\, a^3\, \rho_s$  (8)

Since, the number of particles in a volume element

= (mass of the particles)/(mass of a particle),  (9)

then by substituting equations (6) and (8) in equation (9),
the number of particles in a volume element $$= \frac{(1-p)\rho_s A\,dx}{\frac{4}{3}\pi a^3 \rho_s} \quad (10)$$

$$= \frac{3(1-p)A\,dx}{4\pi a^3} \quad (11)$$

Next since by Stokes Law the drag force on the fluid within the volume element from the particles is equivalent to the product of the number of particles times the force per particle, the drag force = $[3\ (1-p)\ (A\,dx)/4\pi\ a^3]\ (6\pi a\mu)(U-V)$, or  (12)

$= ]9\ (1-p)\mu\ A\,dx\ (U-V)]/2\ a^2$  (13)

Referring again to FIG. 6, by Newton's Second Law of Motion, neglecting wall friction or assuming wall shear forces are small, the total force acting on the volume element $A\,dx$, which comprises the force acting on the left of the volume element $A\,dx$ less the opposing force on the right and the drag force, is equal to the product of the mass and the acceleration. Hence we have the equation, $PA - [P + (\delta P/\delta x)\,dx]\ A - [9\ (1-p)\mu\ A\,dx/2\ a^2]\ (U-V)$
$= \rho_f\, p\ (A\,dx)\ (\delta U/\delta t)$  (14)

where $P$ is the fluid pressure. By clearing and dividing by $d$ vol = $A\,dx$, the equation (14) is simplified and becomes, $-(\delta P/\delta x) - [9\ (1-p)\mu/2a^2]\ (U-V) = \rho_f\, p\ (\delta U/\delta t);$  (15)

the equation for the fluid.
The equation (15) can be made simpler by dividing by $p\, \rho_f$ and introducing the variable $\tau$ used earlier in the equation (5).

$(1/p\rho_f)\ (\delta P/\delta x) + [(1-p)\rho_s/p\rho_f]\ [(U-V)/\tau] + \delta U/\delta t = 0$  (16)

The weight fraction $f$ which as previously mentioned is equivalent to the mass of the dense particles per unit mass of the suspending fluid is defined as follows;

$f = $ mass particles/mass fluid $= (1-p)\rho_s /p\, \rho_f$ (17)

By introducing this definition equation (16) can be further simplified to $(1/p\rho_f)\ (\delta P/\delta x) + f\ [(U-V)/\tau] + \delta V/\delta t = 0$ (18)

Also, the parenthetical term in equation (18) according to equation (5) equals $\delta V/\delta t$ and hence equation (18) can be changed to the equation, $\delta P/\delta x + p\tau_f\ [f(\delta V/\delta t) + \delta U/\delta t)] = 0$ (19)

where is a single, simpler combination of equations (5) and (15). For a no dust condition it will be noted that $f$ equals zero and $p$ is equal to one. Using the continuity equation from usual texts (see page 298 of Streeter, 4th Edition) equation (19) reduces to, $U = (\delta p/\delta \rho_f)^{1/2}$ (20)

the traditional expression for the speed of sound.
Of the three variables in the equation (19); namely $P$, $V$ and $U$, the pressure $P$ is the one most easily sensed. Additionally, it is known that particles do not influence the speed or the frequency of sound but dynamically delay or impede it without altering its frequency. Therefore, it is proposed to analyze the particles by using the sound wave frequency $\omega$ and the phase lag $\beta$. Amplitude attenuation due to energy losses is consequently not a concern. In making this analyisis, it is assumed that the weight density of air changes between rarefactions and condensations are small, that the fractional weight $f$ of the particles is small, that the fluid velocities and pressures are approximately 90° out of phase, and that the porosity of the fluid approaches 100 percent.

By solving equations (5) and (18) simultaneously, it is determined, assuming sinusoidal excitation, that, $$P = -P_o e^{-hx} \sin\left(\omega\left(t - \frac{x}{U_o}\right) - \beta\right) \quad (21)$$

where $\beta = \tan^{-1} [f\,\tau\, \omega/(f + \tau^2\omega^2 + 1)];$  (22)

$U_o = $ the speed of sound, a constant;
$P_o = $ maximum sound pressure, a constant; and $$h = \omega p \rho_f \left(\frac{U_o}{P_o}\right) \sqrt{\frac{(f+1+\tau^2\omega^2)^2 + (f\tau\omega)^2}{1+\tau^2\omega^2}}$$

$$+ \frac{f + \tau^2\omega^2 + 1}{f\tau U_o} \quad (23)$$

The equation (22), if the fractional weight $f$ is assumed small, a typical value of 0.01, can be approximated as, where $$\tan \beta = \frac{f\tau\omega}{\tau^2\omega^2 + 1},$$

or $$= \frac{f}{\tau\omega + \frac{1}{\tau\omega}}$$

(24)

It will be observed from this equation (24) that as $\omega$ approaches zero, the tan $\beta$ approaches zero as would be expected since as the particle velocity approaches equality with the fluid velocity, there is little or no phase lag induced by the presence of particles in the fluid. On the other hand, if $\omega$ becomes very large or approaches infinity, the particle velocity also approaches zero because at high frequencies the particles will not move and the tan $\beta$ will again approach zero. These observations should be made while being mindful that the phase lag is between the sound waves transferred through the fluid without the particles and the sound waves transferred through the fluid with the particles. Therefore, it is known that at some frequency between zero and infinity the tan $\beta$ will be maximum. This always occurs when $\tau\omega = 1$. The equation (24) can now be written, $$\tan \beta_{max} \approx f/2, \text{ or}$$

(25)

$$f = 2 \tan \beta_{max}$$

(26)

If the phase lag is considered to be about 1° or less, as it typically is, the equation (26) can be further simplified to, $$f \approx 2 \beta_{max}$$

(27)

Figure 4:
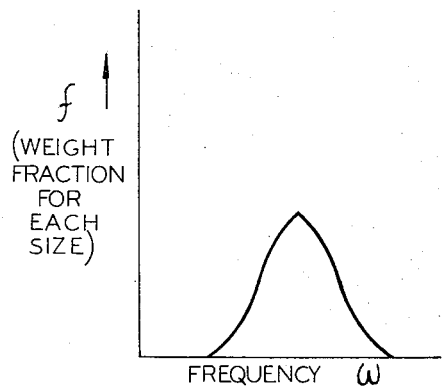
FIG. 4 is a graph showing the weight fraction for a particular size of particle when phase shift and frequency are compared.

The FIG. 4 graph demonstrates an application of the equation (27) to a single particle of radius $a$. As can be observed as the frequency $\omega$ is increased from a minimum to a maximum, the phase shift for that size particle goes through an in between maximum, which is the actual weight fraction value sought when doubled. When there is more than one particle size present, the weight fraction $f$ will be twice the sum of all the maximum phase angles for the different particle sizes. This summation can be accomplished by an integration process.

The diameter D of the particles at the maximum phase angle $\beta$ max can also be ascertained with an assumed density and an appropriate value of fluid viscosity because the product of $\tau\omega$ is unity and $\tau$, as mentioned before, is equivalent to $2 a^2 \rho_s/9\mu$. Thus $$2 a^2 \rho_s \omega/9\mu = 1, \text{ and therefore}$$

(28)

$$D = 2a = 6 \; (\mu/2\rho_s\omega)^{1/2}$$

(29)

Here diameter is determined from the frequency used for the maximum phase lag and an assumed value for the ratio of viscosity to mass density.

The number of particles N in the fluid per unit of volume can too be determined from the equation (17) for $f$ and from the equation (10), either by using assumed or separately measured densities. By these equations (10) and (17), $$N = \frac{f \rho \rho_f}{\frac{4}{3}\pi a^3 \rho_s},$$

(30)

which upon substitution of the equation (27) for $f$ an equation (29) for $a$ becomes, $$N = (\beta_{max} \; p\rho_f/18 \; \pi\rho_s) \; (2\rho_s \; \omega/\mu)^{3/2}$$

(31)

It should be noted that the equations (29) and (31) are still applicable to mixtures of different particle sizes.

The need to scan frequencies to determine the maximum phase shift can be avoided by employing a complex wave shape of a non-sinusoidal waveform comprehending several frequency components. Exemplary and without limitation is a rectangular wave source, or if preferred, a square wave source can be used. Then by utilizing the equation (21) for pressure P and adapting it for a square wave, $$P_f = -\frac{4}{\pi} P_o e^{-hx} \sum_{n=1}^{2n-1} \frac{1}{n} \sin \frac{2\pi n}{\tau}\left(t - \frac{x}{U_o}\right)$$

(32)

where $P_f$ is the pressure measured in the fluid without the particles and $n$ is an index referring to the harmonic components of a square wave and, $$P_p = -\frac{4}{\pi} P_o e^{-hx} \sum_{n=1}^{2n-1} \frac{1}{n} \sin \left[\frac{2\pi n}{\tau}\left(t - \frac{x}{U_o}\right) - \beta_n(1)\right]$$

(33)

where $P_p$ is the pressure in the fluid with the particles, the weight fraction equation (27) becomes, $$f \approx \sum_{n=1}^{2n+1} \beta_n, \text{ for all odd terms}$$

(34)

Assuming once again that the phase angles $\beta_n$ are each relatively small so that the sine approaches its own argument and the cosine is essentially unity, we have the following result which can be readily proven by direct substitution:

$$f = 2 \; \sqrt{\frac{(P_f - P_p)}{P_f} \; \frac{\left(\frac{dP_p}{dt} - \frac{dP_f}{dt}\right)}{\frac{dP_f}{dt}}}$$

(35)

This equation (35) also applies when the pressure waves have saw-tooth or simple sine waveforms.

Figure 1:
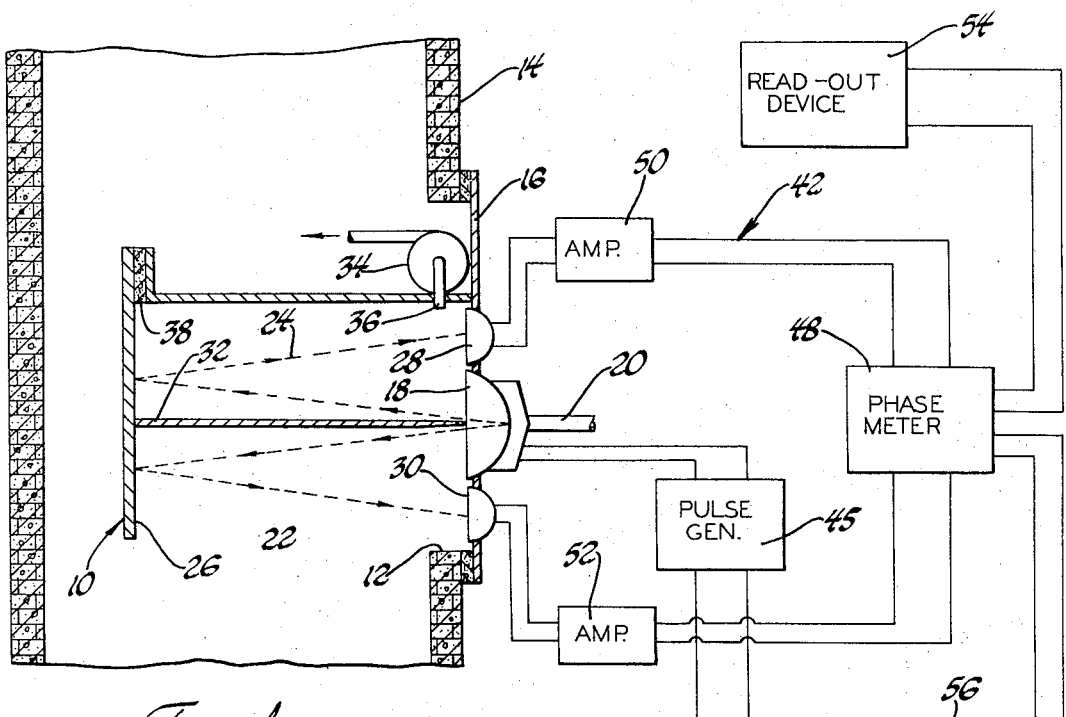
FIG. 1 is a schematic view of a detector apparatus including circuitry for carrying out the method of invention.

To measure these various sound pressures so as to ascertain the phase lag $\beta$, and accordingly the weight fraction $f$, between the sound waves proceeding through the fluid with the particles and the sound waves proceeding through the fluid without the particles, the detector apparatus shown generally at 10 in FIG. 1 can be employed. This detector apparatus 10 is inserted through an opening 12 in an air duct 14 which for demonstration purposes only is illustrated as a smokestack. A cover 16 for the apparatus 10 is appropriately attached in a sealing relation with the smokestack 14 and serves to support the apparatus 10.

The sound waves are developed by a sound emitting transducer or speaker 18 of any commercially available type having the operating characteristics required of the particular application. The speaker 18 can be permanently affixed to the cover 16 or adjustably removably mounted upon a guideway 20, which is attached to the cover 16. The speaker 18 is further adapted to transmit sound along the depicted paths 22 and 24 to a reflector 26 constituting a part of the detector apparatus assemblage. The reflector 26 is formed so as to have a surface that provides the desired sound reflecting characteristics. In the alternative the speaker 18 can replace the reflector 26 if positioned opposite the microphones 28 and 30 so that sound emission is directly thereto.

For receiving the reflected sound waves in the paths 22 and 24, the apparatus 10 respectively employs two sound receiving transducers or microphones 28 and 30 arranged on or near opposite sides of the speaker 18. These microphones 28 and 30 also can be of any commercially available kind with the required operating characteristics for the application. As shown in FIG. 1, the microphones 28 and 30 are positioned at equal distances from the surface of the reflector 26 and may be detachably secured to the cover 16 or to the speaker 18 so as to be adjustably movable therewith on the guideway 20 or secured in some other way if preferred.

As can be observed in FIG. 1, the sound path 22 is open to the interior of the smokestack 14 and therefore is exposed to the fluid with the particles in it, or as it will hereinafter be referred to, the dusty air. To provide air without the particles for the sound waves proceeding along the path 24, the apparatus 10 has an enclosed chamber 32 with a suitable pump 34 at an exit 36. When operating, the pump 34 will withdraw air from the enclosed chamber 32 and at the same time draw air in through an inlet 38 in the enclosed chamber 32. This inlet 38 is provided with a conventional filter 40 which functions to remove the particles so that there is only clean air within the chamber 32. Therefore, the path 22 is by way of the dirty air and the path 24 by way of the clean air.

To make the phase measurements, the detector apparatus 10 includes a measuring system, shown generally at 42. The measuring system 42 has a variable frequency oscillator 44 which can drive the speaker 18 directly at whatever frequency is chosen by a frequency selector 46, or operate a pulse generator 45 which would drive the speaker 18. The oscillator 44 is of any well known kind having an adequate frequency range so that the maximum phase shift between the sound waves in the two paths can be detected. After the microphones 28 and 30 convert the sound waves to electric signals, they are increased by conventional amplifiers 50 and 52 if amplification is required. The comparison of the two sound pressure waves from the paths 22 and 24 and sensed by microphones 28 and 30, is made by a phase meter 48, which could be an oscilloscope.

For readout purposes the phase meter 48 can provide a direct readout, provided the equation (27) is solved by calibrating the phase meter 48 to read double the maximum phase angle $\beta$. If only one particle size is being evaluated, a separate readout device 54, of the appropriate construction such as a recorder, an indicator, a teletype, or the like, can be employed. Also, by appropriately calibrating the readout device 54, the phase lag can be converted to the weight fraction $f$ and value $f$ can be read directly.

If, and as mentioned, more than one particle size exists, as usually occurs, then a suitable integrator 56 can be connected to the output of the phase meter 48 and also to the output of the variable frequency oscillator 44. This integrator 56 will, in effect, sum the different maximum phase shifts that are detected due to each separate particle size causing a different maximum phase shift as the frequency range is scanned. The integrator 56 also can be coupled to a readout device 58 similar to readout device 54 to provide the desired readout.

Figure 2:
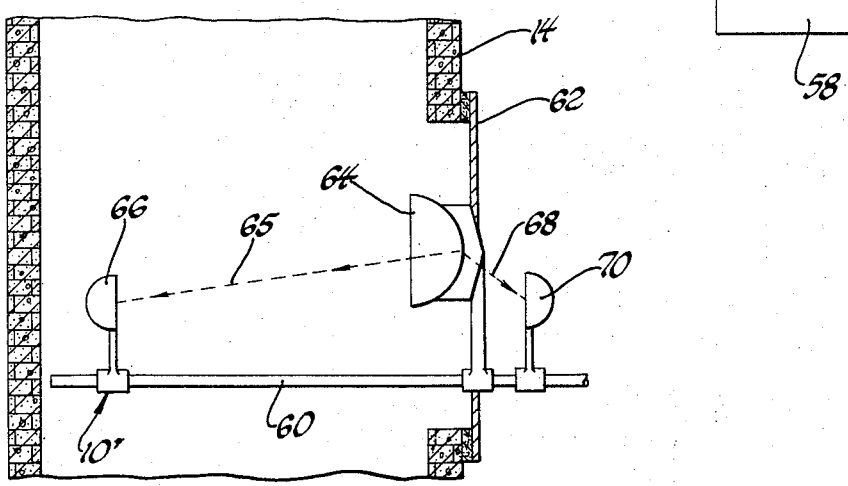
FIG. 2 is a schematic view of alternative type detector apparatus.

In FIG. 2 an alternative construction is depicted which eliminates the enclosed chamber 32 used in the FIG. 1 embodiment. As illustrated, the detector apparatus, which is denoted by the numeral 10', has an elongated rod-like frame 60 extending into the smokestack 14. The frame 60 at the right end, as viewed in FIG. 2, is supported by a cover 62 similar to the cover 16 in the FIG. 1 embodiment. Supported on this end of the frame 60 is a speaker 64, which can be movable with the cover 62 or can be separately movable, if desired, on the frame 60. The sound waves from the speaker 64 traverse a dusty air path 65; i.e., a path with the fluid particles to a microphone 66 adjustable and slidably positioned on the opposite end of the frame 60. The speaker 64 is also adapted to emit the sound waves to the outside of the smokestack 14 by way of a clean air path 68 to a microphone 70. This microphone 70 is adjustably and slidably positioned on the part of the frame 60 extending to the exterior of the smokestack 14. This FIG. 2 embodiment can use the FIG. 1 measuring system 42 provided the calibration is made for the difference in the lengths of the two paths 65 and 68 which can be built into the measuring system 42 in any well known way to provide the appropriate delay or by calibrated positioning of the microphones 66 and 70 relative to the speaker 64.

Figure 3:
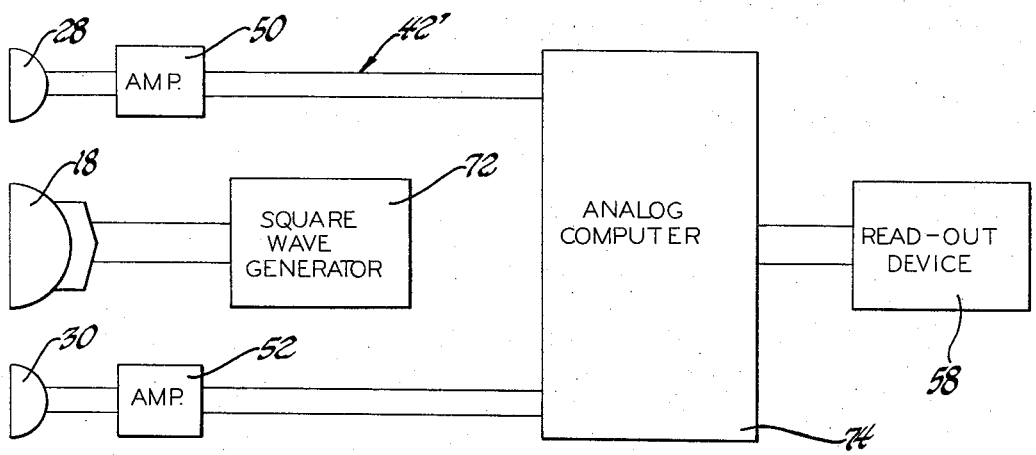
FIG. 3 is a block diagram of circuitry to be used when the method employs non-sinusoidal sound waves.

Referring now to FIG. 3, a measuring system denoted generally by the numeral 42' can be employed when sine or certain non-sinusoidal wave forms are employed. The measuring system 42' can be utilized in the FIGS. 1 and 2 embodiments to replace the measuring system 42 and includes for demonstration purposes a square wave generator 72 which drives the speaker 18. As has been explained, some other type of sound generator that provides a non-sinusoidal wave form such as a saw-tooth generator could also be employed. The two microphones 28 and 30 have their outputs increased, respectively, by the amplifiers 50 and 52, if required, and then these amplified outputs are supplied to the input of an analog computer 74 which functions to solve equation (35) by circuitry well known to those versed in the art. The near instantaneous output or solution to the equation from the analog computer 74 is then supplied to the readout device 58 to measure, for instance, the particulates from a rapidly changing process.

To describe the operation of the FIG. 1 detector apparatus in carrying out the method, it is again mentioned that the density of the particles being analyzed is known. Also, it is generally known that the particles will have a certain range of sizes. Therefore, the frequency range to be scanned can generally be established from this knowledge, keeping in mind that the low frequencies excite the larger particles and the high frequencies the smaller particles.

The sound wave generation step is initiated by turning on the variable frequency oscillator 44 to provide the frequency range scan from some minimum frequency to a maximum. The reason for this is, as explained, with respect to equation (27), that as $\omega$ goes from approximately zero and then approaches infinity, the tan $\beta$ will as a result, go from approximately zero through a maximum and then back to zero. The oscillator 44 will operate the pulse generator 45, which will drive the speaker 18 and cause the sound waves to be emitted along the dirty air path 22 and the clean air path 24. The comparison step is carried out by the two microphones 28 and 30, which respectively sense pressure of the sound waves proceeding along the path 24 without the particles and along the path 22 which includes the particles of the different sizes. The resultant electric signals developed by the microphones 28 and 30 then are amplified and phase compared by the phase meter 48.

Figure 5:
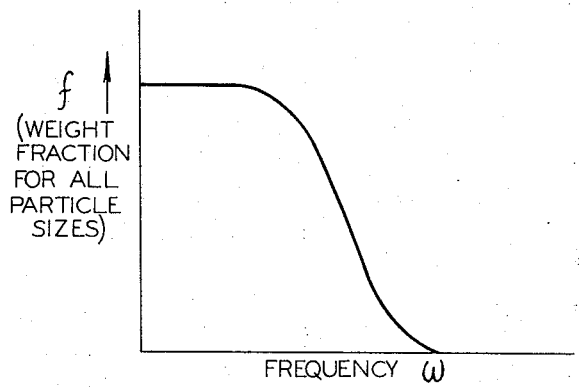
FIG. 5 is a graph showing the total weight fraction for different particle sizes when the phase shifts are integrated.

Because the different particle sizes will result in different maximum phase shifts as the frequency scanning takes place, there will be an undulating wave form with several peaks developed each of the type shown in FIG. 4. These maximums will be integrated by the integrator 56 and supplied to the readout device 58. The readout will then appear somewhat as shown in FIG. 5 for a scan starting from a very high frequency. Of course, if only one particle size is to be analyzed, then the integrator 56 would not have to be used and in accordance with the equation (27), twice the maximum phase shift detected would be the weight fraction $f$ observed or recorded by the readout device 54. Now, both the diameter and the number of these particles present per unit volume can be determined from equations (29) and (31) using assumed values of particle density and fluid viscosity.

With the FIG. 1 detector apparatus, it is expected that the viscosities and temperatures of the fluids or air with and without the particles are substantially the same because of the location of the adjacent microphones 28 and 30 within the detector apparatus 10. However, in FIG. 2, compensation may be required with the microphone 70 on the outside of smokestack 14, for the two fluids involved can be quite different as earlier mentioned. This compensation can be made within the measuring system 42, by calibrations well known in the art. Also sufficient delay compensation for the spacing difference between the microphones 66 and 70 can be made in the same way or by moving the microphones 66 and 70 relative to the speaker 64 so that calibration signals can be synchronized at a very high frequency with paths differing by zero or an integral number of sound wave-lengths in the respective media.

In general the method carried out by the use of either the FIG. 1 or FIG. 2 detector apparatus 10 or 10' is the same with the FIG. 3 measuring system except that there is no need to provide a frequency scan as long as a square wave generator 72 is employed and the resultant square wave has a multiplicity of frequencies.

Then the analog computer 74 in accordance with the equation (35) will provide the value of $f$ from the signals sensed by the microphones 28 and 30. Should square waves be generated at progressively higher frequencies, the system of FIG. 3 would thus trace the curve of FIG. 5.

From the foregoing, it will be appreciated that the method renders it possible to utilize relatively simple portable or permanently stationed detector apparatus for measuring the weight fraction $f$ by using either a frequency scan or a single non-sinusoidal wave form.

What is claimed is:

1. The method of analyzing particles of a certain mass density in a fluid of a certain viscosity, porosity and mass density comprising the steps of generating sound wave energy having plural frequency characteristics, transmitting the sound wave energy through the fluid with the particles and also through a fluid without the particles, sensing the sound wave energy transmitted through both the fluid with the particles and the fluid without the particles and developing corresponding signal quantities, comparing the fluid with the particles signal quantity with the fluid without the particles signal quantity to determine the maximum phased difference therebetween and the frequency characteristic at which the maximum phase difference occurs, and determining from the maximum phase difference and the frequency characteristic at which the maximum phase difference occurs data relative to the particles in accordance with a certain scheme.

2. The method as described in claim 1, wherein the sound wave energy generating step is carried out by generating the sound wave energy at each of a plurality of frequencies over a frequency range having a predetermined minimum frequency and a predetermined maximum frequency.

3. The method as described in claim 2, wherein the determining step includes determining the number of particles N in the fluid per unit of volume in accordance with the equation, $$N = (\beta \max p\rho_f/18\pi\rho_s)(2\rho_s \omega/\mu)^{3/2}$$

where $\beta$ max is the maximum phase difference, $p$ is the porosity of the fluid, $\rho_f$ is the mass density of the fluid, $\rho_s$ is the mass density of the particles, $\mu$ is the fluid viscosity, and $\omega$ is the frequency at which the maximum phase shift occurred.

4. The method as described in claim 2, wherein the determining step is carried out by integrating the maximum phase shifts over the predetermined frequency range to determine the total particle weight fraction for the fluid with the particles.

5. The method as described in claim 1, wherein the determining step includes determining the mass of the dense particles per unit mass of the fluid.

6. The method as described in claim 5, wherein the mass of the dense particles per unit mass of the fluid or the fractional weight $f$ is determined according to the equation $f = 2\beta$ max, where $\beta$ max is the maximum phase shift.

7. The method as described in claim 1, wherein the determining step includes determining the number of the particles in the fluid per unit of volume.

8. The method as described in claim 1, wherein the transmitting step is carried out by tranferring the sound wave energy through an enclosure through which the fluid containing the particles passes and to a sound receiver and by transferring the sound wave energy external of the enclosure through fluid without the particles and to another sound receiver.

9. The method as described in claim 1 wherein the transmitting step is carried out by transferring the sound wave energy through a passageway containing the fluid with the particles to a sound receiver and transferring the sound wave energy through an isolating enclosure positioned within the passageway and arranged so as to contain the fluid without the particles.

10. The method as described in claim 1, wherein the sound wave energy generating step is carried out by generating multi-frequency component non-sinusoidal sound waves and the sensing step is carried out by sensing the pressures imposed on a sound receiver by the sound waves transferred through the fluid with the particles and the sound waves transferred through the fluid without the particles so as to develop the signal quantities.

11. The method as described in claim 10, wherein the determining step includes determining the fractional weight f in accordance with the equation, $$F = 2\sqrt{\frac{(P_f - P_p)}{P_f}\left(\frac{dP_p}{dt} - \frac{dP_f}{dt}\right) / \frac{dP_f}{dt}}$$

where $P_f$ and $P_p$ are the pressures imposed on the sound receivers by the sound waves transferred through the fluid without the particles and with the particles respectively and the phase angles are relatively small.

12. The method as described in claim 10, wherein the determining step includes determining the fractional weight f in accordance with the equation, $$f = \sum_{n=1}^{2_n+1} \beta_n$$

where $\beta_n$ is the maximum phase angle of each frequency component of the non-sinusoidal sound wave and n is an index referring to the harmonic components of the non-sinusoidal sound waves.

13. The method as described in claim 1, wherein the determining step includes determining the diameter of the particles.

14. The method as described in claim 13, wherein the diameter D of the particles is determined in accordance with the equation, $$D = 6\,(\mu/2\,\rho_s\,\omega)^{1/2}$$

where $\mu$ is the viscosity of the fluid, $\rho_s$ is the mass density of the particles and $\omega$ is the frequency at which the maximum phase shift occurred.

15. The method as described in claim 1, wherein the determining step includes determining the diameter of the particles, the number of the particles in the fluid per unit of volume, and the mass of dense particles per unit of mass of the fluid.

* * * * *

UNITED STATES PATENT OFFICE
CERTIFICATE OF CORRECTION

Patent No. 3,802,271                    Dated April 9, 1974

Inventor(s) Peter C. Bertelson

It is certified that error appears in the above-identified patent and that said Letters Patent are hereby corrected as shown below:

Column 2, line 61, after "This" delete "equiation" and insert --equation--.

Column 3, line 10, equation 8, that portion of the equation reading "(4/3)ρ" should read --(4/3)π--.

Column 3, line 37, equation 13, that portion of the equation reading "=]9" should read --=[9--.

Column 4, line 18, equation 19, that portion of the equation reading "+pτ$_f$" should read --+pρ$_f$--.

Column 4, line 21, delete "where" and insert --which--.

Signed and sealed this 1st day of October 1974.

(SEAL)
Attest:

McCOY M. GIBSON JR.                     C. MARSHALL DANN
Attesting Officer                       Commissioner of Patents